United States Patent
Wilson

(10) Patent No.: US 8,055,272 B1
(45) Date of Patent: Nov. 8, 2011

(54) METHOD AND SYSTEM FOR ADJUSTING PROCESSING DURATION IN A POSITION-DETERMINING SYSTEM

(75) Inventor: Scott B. Wilson, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1033 days.

(21) Appl. No.: 11/786,823

(22) Filed: Apr. 13, 2007

(51) Int. Cl.
*H04W 24/00* (2009.01)

(52) U.S. Cl. ............... 455/456.1; 455/404; 455/433; 455/457; 455/423; 455/440; 379/45

(58) Field of Classification Search ............ 455/456, 455/404, 433, 457, 9, 423, 426, 440, 456.1; 379/45
See application file for complete search history.

(56) References Cited

U.S. PATENT DOCUMENTS

| | | | | |
|---|---|---|---|---|
| 6,429,808 | B1* | 8/2002 | King et al. | 342/357.02 |
| 7,149,504 | B1* | 12/2006 | Weaver et al. | 455/414.2 |
| 7,505,757 | B2* | 3/2009 | Rowitch et al. | 455/411 |
| 2004/0203885 | A1 | 10/2004 | Quaid | |
| 2005/0043037 | A1 | 2/2005 | Ioppe et al. | |
| 2006/0258371 | A1* | 11/2006 | Krishnamurthi et al. | 455/456.1 |
| 2006/0274696 | A1* | 12/2006 | Krishnamurthi | 370/331 |
| 2007/0149213 | A1* | 6/2007 | Lamba et al. | 455/456.1 |
| 2007/0275732 | A1* | 11/2007 | Jethwa et al. | 455/456.1 |

* cited by examiner

*Primary Examiner* — Meless N Zewdu
*Assistant Examiner* — Mahendra Patel

(57) ABSTRACT

The present invention provides a method and system for helping to improve processing duration and successful position determination in a position-determining system. The position-determining system receives a request to determine position of a mobile station, such as a cellular wireless communication device, and the request includes a timer value indicative of the maximum allowed time for responding to the request. The position-determining system then dynamically determines how long to spend attempting a primary location-determination process, based on the indicated timer value and an expected time necessary to employ a fallback, or secondary, location-determination process. If the position-determining system fails to determine the position within the time allocated to the primary process, it resorts to application of the secondary position-determination process. If either the primary or the secondary tier of location determination determines a position, that position is returned to the requesting entity; otherwise, a default or error message is returned.

14 Claims, 5 Drawing Sheets

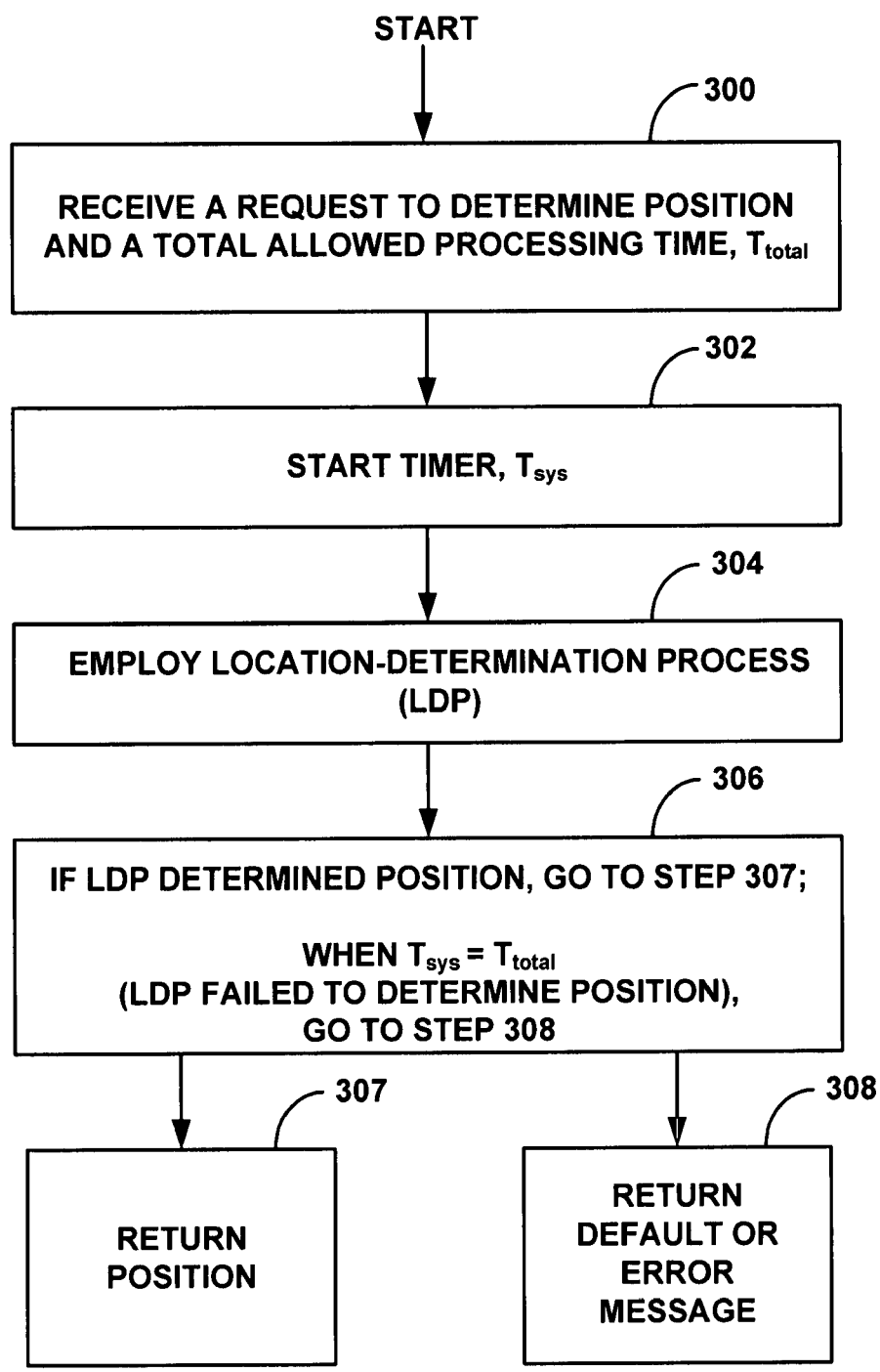

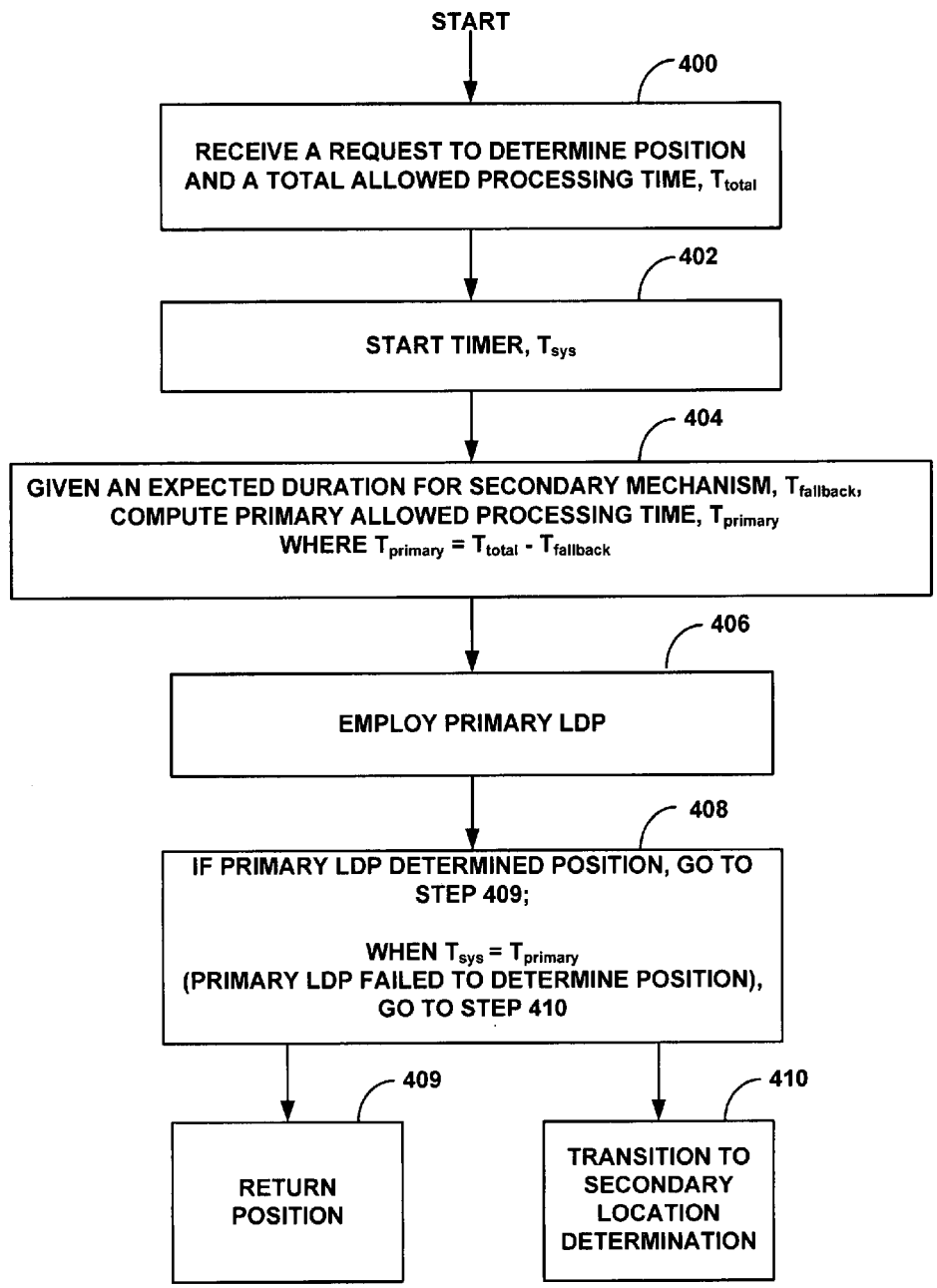

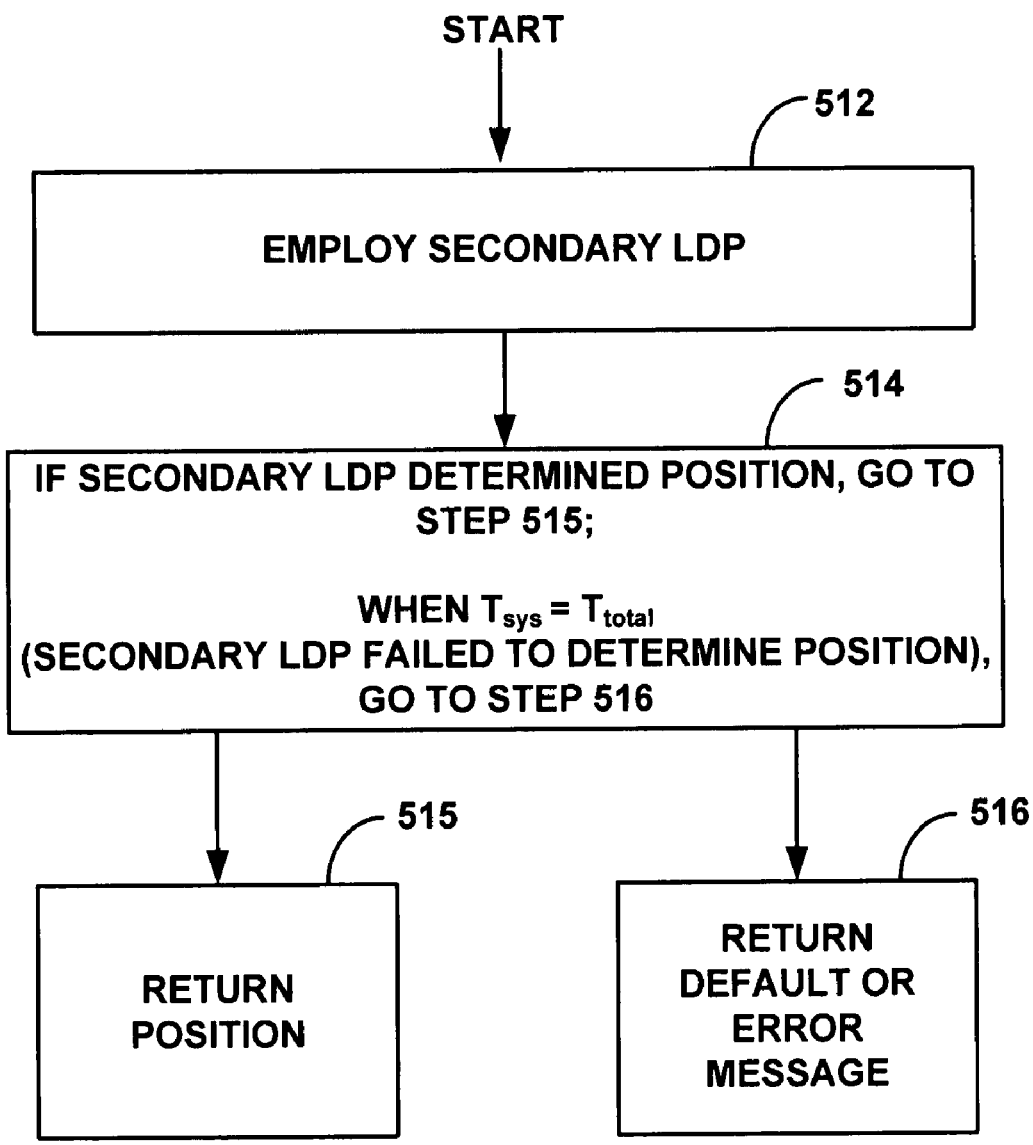

METHOD AND SYSTEM FOR ADJUSTING PROCESSING DURATION IN A POSITION-DETERMINING SYSTEM

FIELD OF THE INVENTION

The present invention relates to mobile position-determining systems and, more particularly, to processing time in such systems.

BACKGROUND

Cellular wireless is an increasingly popular means of personal communication in the modern world. To provide cellular wireless communication services, as shown in FIG. 1, a wireless carrier typically operates a number of radio access networks (RANs) 12, each of which is controlled by a switching entity such as a mobile switching center (MSC) 14. The MSC generally includes or connects with one or more base station controllers (BSCs) 16, which in turn connect with one or more base transceiver stations (BTSs) 18. Each BTS conventionally includes a cell tower with one or more antennas that radiate to define an air interface 20 in which mobile stations can operate. With this arrangement, a mobile station 22 that operates in any air interface of the carrier's network can communicate through a RAN with entities on a transport network such as the public switched telephone network (PSTN) or the Internet.

An important feature of contemporary cellular wireless networks is an ability to locate the geographical position of a mobile station. Such a feature was initially developed to assist emergency services in locating a mobile station. However, the availability of location information to support E911 services has given rise to the development of many other location-based service (LBS) applications as well.

For instance, given the location of a mobile station, an LBS provider (e.g., a wireless cellular carrier or third party) can provide the mobile station user with a weather or traffic report in the user's vicinity. As another example, an LBS provider can report a list of services or establishments (e.g., restaurants, parks, or theatres) in the user's vicinity. As still another example, an LBS provider can provide a mobile station user with a map of the user's location or with directions for travel between the user's location and another location. As yet another example, knowing that a mobile station is operating in a particular location, an LBS provider can send the mobile station a location-based message, such as an advertisement or coupon for a nearby establishment. Other LBS applications exist currently, and more will inevitably be developed in the future.

In practice, when an LBS application wants to determine the location of a mobile station, the application may send a location request message to the wireless carrier that serves the mobile station. In response, the carrier may then send a signaling message through its network to determine where the mobile station is currently located, and the carrier may then generate a response to the location request and send that response to the LBS application.

More particularly, in a common arrangement, a wireless carrier will operate a mobile positioning center (MPC) 24 that is arranged to determine and report mobile station locations to requesting entities. The MPC may include or have access to a position-determining entity (PDE) 26, which may operate to determine the location of a given mobile station based on (i) the centroid of the cell/sector in which the mobile station is currently operating and (ii) satellite-based positioning information provided by the mobile station. Further, the carrier may operate a location server 30 that acts as a front-end for receiving location requests from LBS applications and forwarding those requests to the MPC.

When the location server receives a location request from an LBS application, the location server may send a corresponding location request to the MPC (e.g., via a link 32, which could be a direct packet link or a packet-switched network), and the MPC/PDE may, in turn, determine the location of the mobile station. The MPC may then return the determined location of the mobile station to the location server, and the location server may then return to the LBS application the determined location or data derived from the determined location (such as mapping, routing, or street address information).

A location request to the MPC may seek either a general or a specific indication of the mobile station's location. A general indication of the mobile station's location may be an indication of the location of the cell/sector in which the mobile station is currently operating, such as the geographic location of a centroid of the cell/sector. A specific indication of the mobile station's location, on the other hand, could be a more precise indication of the geographic position of the mobile station itself.

To learn the cell/sector that is currently serving a mobile station, the MPC may send a "low-accuracy" location request to the RAN that is currently serving the mobile station, and the RAN may respond with an indication of the cell/sector in which the mobile station is currently operating. To learn a more specific geographic position of the mobile station, on the other hand, the MPC may send a "high-accuracy" location request to the PDE, and the PDE may then send one or more high accuracy location requests to the serving RAN and receive high accuracy positioning data—such as positioning information that the mobile station receives from one or more satellites—in response from the RAN. The PDE may then use that high accuracy positioning data, typically in combination with the cell/sector centroid determined by the MPC, to identify the mobile station's geographic position. Throughout this specification, the terms "position" and "location" are used interchangeably.

Today, two disparate mechanisms are known for providing communication between a positioning system and a mobile station: (i) "control plane" signaling and (ii) "user plane" signaling. Control plane signaling is the traditional mechanism for communicating position-related data between a positioning system and a mobile station via a switch such as an MSC. User plane signaling has been developed more recently to provide a more streamlined form of communication between a positioning system and a mobile station using 2-way Short Messaging Service (SMS) signaling and/or through IP communication, so that mobile station can pass any desired location data directly to the positioning system without using a switch. Examples are described herein in the context of the control plane, but the invention could just as easily be practiced using the user plane.

In a typical arrangement, the location requests from the MPC/PDE to the RAN will go from the MPC/PDE over a signaling network (e.g., a Signaling System #7 (SS7) network) 34 to the MSC of the RAN. In order to send such a request, the MPC may query a home location register (HLR) 36, also via the signaling network, to determine the point code subsystem number (PC_SSN) of the MSC currently serving the mobile station. For instance, the MPC may send an IS-41 "Location Request" (LOCREQ) message to the HLR, or an IS-637 "SMS Request" (SMSREQ) message to the HLR, also providing the HLR with an identifier of the mobile station, and the HLR would respond (in a LOCREQ return result (locreq_rr) or SMSREQ return result (smsreq_rr)) with the PC_SSN of the currently serving MSC (or a last known serving MSC). The query to the HLR could carry a mobile station identifier (such as a mobile directory number (MDN)) as indicated in the initial location request to the MPC.

Industry standard 3GPP2 X.P0002/TIA PN-4747 (IS-881), in turn, defines many of the location request messages that pass between the MPC, PDE and MSC. For instance, a low-accuracy location request from the MPC to the MSC may take the form of an IS-881 "Inter-System Position Request" (ISPOSREQ) message, and a response to that message may take the form of an IS-881 ISPOSREQ return result (isposreq_rr) message. A high-accuracy location request from the MPC to the PDE may take the form of an IS-881 "Geo Position Request" (GPOSREQ) message, and a response to that message may take the form of an IS-881 GPOSREQ return result (gposreq_rr) message. Normally, a GPOSREQ inhabits the control plane, but the user plane supports an analogous GPOSREQ message that differs from the control plane counterpart only in the transmission media and likely transmission speed. These user plane analogues can be referred to as GPOSREQ' messages—having corresponding return result gposreq_rr' messages. Throughout this specification, the terms "GPOSREQ" and "gposreq_rr" refer collectively to both control plane GPOSREQ messages and user plane GPOSREQ' messages. Additionally, a high-accuracy location request from the PDE to the MSC may take the form of an IS-881 "Short Message Delivery Point to Point" (SMDPP) message, and a response to that message may take the form of an IS-881 SMDPP return result (smdpp_rr) message.

Further, industry standard IS-801 defines position-determination messages that can pass over an air interface between an MSC and a mobile station for the purposes of requesting and receiving high-accuracy location data. For instance, the MSC can send an IS-801 position determination request (PD Request) message over the air to a mobile station, to request that the mobile station provide satellite-based positioning information, and the mobile station can respond with an IS-801 position determination response (PD Response) message over the air to the MSC, providing the requested satellite-based positioning information.

In operation, when the MPC receives a request for a general indication of a mobile station's location, the MPC would first identify the MSC serving the mobile station and would then send an ISPOSREQ message to the MSC, seeking an indication of the cell/sector in which the mobile station is currently operating. If the MSC has the requested cell/sector information, the MSC may then provide an indication of the cell/sector in an isposreq_rr message to the MPC. Otherwise, the MSC may page the mobile station over the air interface so as to receive in a page response from the mobile station an indication of the cell/sector, and the MSC may then send an indication of the cell/sector in an isposreq_rr to the MPC. Once the MPC learns the cell/sector in which the mobile station is currently operating, the MPC may determine (e.g., look up) the geographic centroid of the cell/sector. The MPC may then report that centroid in a response to the location request.

On the other hand, when the MPC receives a request for a specific indication of a mobile station's location, the MPC may invoke the PDE to determine the location. More particularly, the MPC may first identify the MSC serving the mobile station and may send an ISPOSREQ to the MSC to determine the cell/sector in which the mobile station is currently operating, and the MPC may determine the centroid of that cell/sector. The MPC may then send a GPOSREQ to the PDE, providing the PDE with (i) an identifier of the mobile station, (ii) an identifier of the serving MSC, and (iii) the determined cell/sector centroid.

Upon receipt of the GPOSREQ, the PDE may then use the cell/sector identity to determine (e.g., look up) what satellite(s) the mobile station can use to obtain satellite-based positioning information. The PDE may then send an SMDPP message to the MSC, specifying one or more satellites that the mobile station should use to obtain satellite-based positioning information. In response to the SMDPP message, the MSC may then send an IS-801 PD Request message over the air to the mobile station, indicating the satellite(s) from which the mobile station should get positioning information.

(Normally, the MSC will send the IS-801 PD Request over an air interface traffic channel to the mobile station. Thus, if the mobile station is currently engaged in a communication session and thus already has an assigned traffic channel, the MSC may send the PD request over that traffic channel. On the other hand, if the mobile station is idle or dormant and therefore does not have a traffic channel, the MSC may direct the serving BSC to assign a traffic channel to the mobile station, and the MSC may send the PD request over that traffic channel. In a preferred embodiment, the ISPOSREQ that the MPC sends to the MSC in a high-accuracy location determination scenario would include a code that puts the MSC on notice that the MSC will soon receive a high-accuracy location request, so that the MSC can assign the traffic channel in advance if desired.)

In turn, the mobile station would look to the designated satellite(s) to obtain the requested satellite-based positioning information and would provide that information in an IS-801 PD Response message over the air to the MSC. Upon receipt of the PD Response message, the MSC would then generate and send an smdpp_rr to the PDE, providing the PDE with the requested satellite-based positioning information.

If the PDE thereby receives from the mobile station the requested satellite-based positioning information from at least three of the designated satellites, the PDE may then use that information to determine, with a fairly high degree of accuracy, the position of the mobile station using well known "Assisted GPS" (AGPS) computation. On the other hand, if the PDE does not receive at least three satellites-worth of positioning information from the mobile station, then the PDE may ask the mobile station for information from still other satellites. Ultimately, once the PDE receives sufficient satellite-based positioning information from the mobile station, the PDE may determine the mobile station's location and then respond to the MPC with a gposreq_rr, providing the MPC with the determined location. In turn, the MPC may then report that location in a response to the location request that it received.

In some instances, it may happen that the PDE is unable to obtain the necessary satellite-based positioning information from the mobile station to facilitate determination of the mobile station's location using AGPS. When that happens, the PDE may then resort to determining the mobile station's location by one or more other well-known mechanisms. For instance, the PDE may next try to determine the mobile station's location using a hybrid satellite-network fix (e.g., computing location based on some satellite-based positioning information and some base station almanac data, such as serving-one-way-delay data). As another example—perhaps if the hybrid satellite-network fix fails as well—the PDE may next try to determine the mobile station's location using mixed cell advanced forward link trilateration (AFLT) (perhaps using base station almanac data for at least three base stations in communication with the mobile station). As yet another example (perhaps if the AFLT fix fails as well), the PDE may next determine location as the mere cell/sector location.

Understandably, some of these fallback location-determination mechanisms would not provide location with the high level of granularity desired, but they are likely to provide at least some location fix, which may be better than providing no location fix at all. Thus, once the PDE determines the location of the mobile station by one of these fallback mechanisms, the PDE would similarly return that determined location to the MPC in a gposreq_rr message, and the MPC may then report that location in a response to the location request that it received.

In many cases, the PDE will apply a fixed internal timer that indicates a maximum amount of time that the PDE should take to respond to a GPOSREQ from the MPC. If the PDE determines the location of the mobile station within that maximum allowed time, the PDE will then return that determined location to the MPC in a gposreq_rr. On the other hand, if the PDE does not successfully determine the location of the mobile station within the maximum allowed time, then, when the timer expires, the PDE may return an error to the MPC, indicating that the PDE has not determined the mobile station location. For instance, if the PDE first fails with AGPS to determine the mobile station and then proceeds to attempt a hybrid satellite-network fix but the timer expires during that attempt, then the PDE may return an error in a gposreq_rr to the MPC. If the MPC receives such an error response from the PDE, the MPC may then default to returning in its response to the requesting LBS application the mere cell/sector centroid (or a representation of the cell/sector centroid), or a corresponding error message.

SUMMARY

The present invention provides a method and system for helping to avoid location-determination failures, by systematically adjusting processing duration in a position-determining system such as a PDE. In particular, the invention involves dynamically redefining the maximum allowed processing time for a position-determining system to determine location, and using that maximum allowed processing time to set one or more processing time limits within the position-determining system. Given these parameters, the position-determining system can employ one or more location determination processes, designated as either primary or secondary processes, in response to a location request.

BRIEF DESCRIPTION OF THE DRAWINGS

Several embodiments of the present invention are described herein with reference to the drawings, in which:

FIG. 3 is a flow diagram of a basic embodiment employing a single tier of location determination.

FIGS. 4 and 5 are flow diagrams of a more sophisticated embodiment employing two tiers of location determination.

DETAILED DESCRIPTION

Overview

Figure 1:
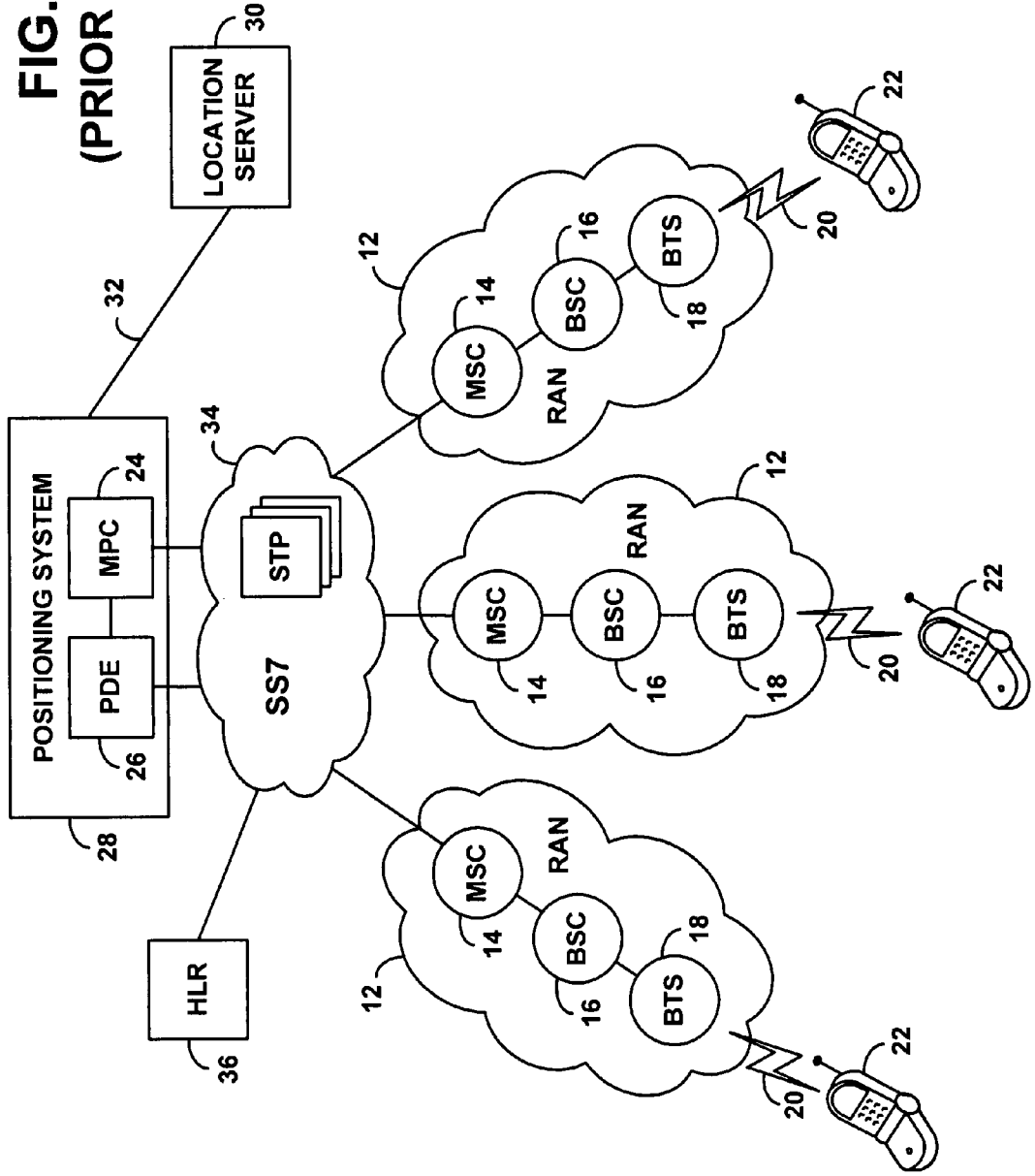
FIG. 1 is a block diagram of a telecommunications system in which the several embodiments can be practiced.

The present invention provides a method and system for helping to avoid location-determination failures, by systematically adjusting processing duration in a position-determining system, such as a PDE. In accordance with an exemplary embodiment of the invention, a GPOSREQ from an MPC to a PDE may carry a specific time value specifying maximum allowed processing time by the PDE. The time value may be selected (by the MPC or LBS application for instance) based on various factors, such as (i) the type of LBS application requesting the location, (ii) the time of day, (iii) the LBS application's wait tolerance, or (iv) one or more other factors. The LBS application's wait tolerance is the amount of time that the application is willing to wait for a location fix before it will abort a location request. The PDE may then apply that specifically designated time limit when working to determine location in response to the GPOSREQ. In particular, the PDE may set a timer in accordance with the specified time value and (i) if the PDE determines the location within the allowed time, then the PDE may then provide the MPC with a gposreq_rr specifying the determined location, whereas (ii) if the PDE does not successfully determine the location within the allowed time, then the PDE may return an error or some default response to the MPC.

Furthermore, given that one or more fallback location-determination processes (e.g., hybrid, AFLT, or others) are typically more certain to succeed than the primary location determination process (e.g., AGPS) applied by the PDE, the PDE, MPC, or other entity may further dynamically set a time limit for the PDE to attempt the primary location determination process, based on an empirical knowledge of how long it typically takes to determine location using one or more fallback location determination processes. For instance, if it normally takes about 8 seconds to determine mobile station using the typical fallback mechanism(s), and if the dynamically specified total processing time is 30 seconds, then the PDE may dynamically compute that it should spend no more than 30−8=22 seconds applying the primary location-determination process before resorting to a fallback process (if unsuccessful with the primary location-determination process within that timeframe). Note, of course that the same concept can be applied at any level; for instance, after failing with AGPS, a time for attempting a hybrid location determination fix can be computed by subtracting from the total time remaining the amount of time that it generally takes to carry out other fallback mechanisms.

Advantageously, this inventive process helps to avoid having the position-determining system return an error merely because the position-determining system spent too much time trying to compute location with the primary (typically higher accuracy) location-determination process. That is, with the benefit of the invention, the position-determining system can dynamically alter how long it spends applying the primary location-determination process before switching over to apply a secondary location-determination process, thus helping to reduce the chances of complete failure of the position-determining system to determine location.

In one respect, the exemplary embodiment of the invention may thus take the form of a method of adjusting processing duration in a position-determining system, where the position-determining system applies a primary mechanism (e.g., AGPS) to determine a position (e.g., of a cellular mobile station) and, if the primary mechanism fails to determine the position, then applies a secondary mechanism (i.e., satellite-network hybrid, AFLT, cell/sector location, or any combination thereof) to determine the position.

According to the method, the position-determining system would receive a request to determine the position, and the request would include a designation of total allowed processing duration for determining the position. The position-determining system would then compute a primary allowed processing duration as a difference between (i) the designated total allowed processing duration and (ii) a predefined value representing an expected duration for successfully applying the secondary mechanism(s) to determine the position. In turn, the position-determining system would then detect that the computed primary allowed processing duration has passed while applying the primary mechanism without yet successfully determining the position, and the position-determining system would responsively transition to apply the secondary mechanism in an effort to determine the position.

In another respect, the exemplary embodiment may take the form of a position-determining system that includes a communication-interface, a processor, data storage, and position-determining logic stored in the data storage and executable by the processor, where the position-determining logic is executable, upon receipt of a request to determine a position of a mobile station, to apply a primary mechanism to determine the position and, if the primary mechanism fails to determine the position, to then apply a secondary mechanism to determine the position.

In accordance with this embodiment, the request would include a designation of total allowed processing duration for determining the position. The position-determining logic would then be executable, upon receipt of the request, to compute a primary allowed processing duration as a difference between (i) the designated total allowed processing duration and (ii) a predefined value representing an expected duration for successfully applying the secondary mechanism to determine the position. Further, the position-determining system would be executable to detect that the computed primary allowed processing duration has passed while applying the primary mechanism without yet successfully determining the position, and to responsively transition to apply the secondary mechanism in an effort to determine the position.

In these or other embodiments of the invention, the request that the position-determining system receives may comprise a GPOSREQ from an MPC. Further, the designated total allowed processing duration may be included in a field of the GPOSREQ that carries delay guidance information. For instance, the designated total allowed processing duration may be included in a "PositionQualityofService" field of the GPOSREQ. More particularly, the designated total allowed processing duration may be included in a "PQOS Response time" portion of the PositionQualityofService field of the GPOSREQ.

Further, in a scenario where the request is a GPOSREQ from an MPC, the method or position-determining logic may additionally operate to output to the MPC a gposreq_rr that designates the position determined by the secondary mechanism. In addition, in a scenario where the MPC had received the request (i.e., the request for location, whether or not in the same form as a GPOSREQ) from an LBS application, the MPC may then transmit an indication of the designated position (indicated in the gposreq_rr) to the LBS application.

In yet another respect, an exemplary embodiment of the invention may take the form of a method of adjusting processing duration in a position-determining system. In a scenario where the position-determining system applies a primary mechanism to determine a position, if the primary mechanism fails to determine the position, the position-determining system then applies a secondary mechanism to determine the position.

In this additional embodiment, the position-determining system would receive a request to determine the position, and the request would include a timer value that indicates the total allowed processing duration for determining the position. The position-determining system would then apply the timer value and thus attempt to determine the position within the indicated allowed processing duration. If the position-determining system fails to determine the position with the indicated allowed processing duration, then the position-determining system would return an error or default response to request. On the other hand, if the position-determining system determines the position within the indicated allowed processing duration, then the position-determining system would return the determined position in response to the request.

Exemplary Architecture

Figure 2:
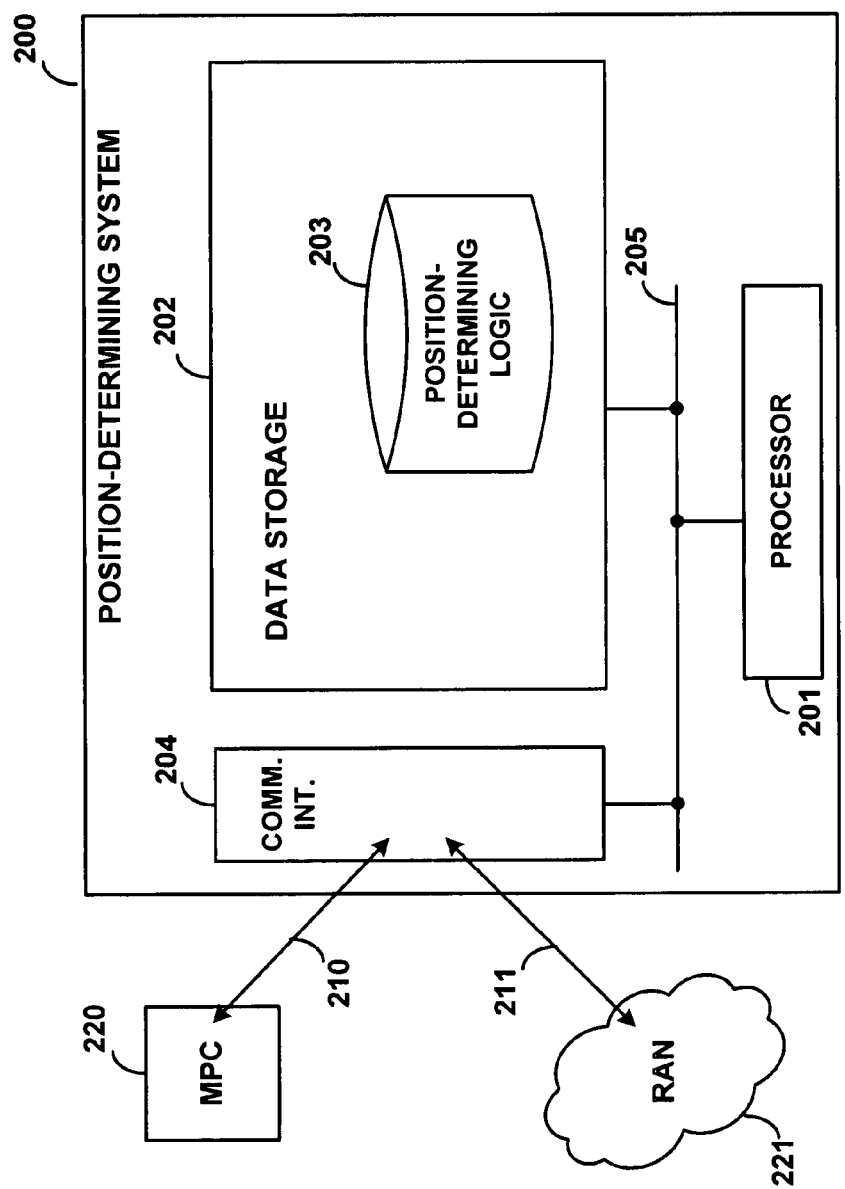
FIG. 2 is a block diagram of an exemplary position-determining system with its processing, communication, and storage components.

FIG. 2 depicts an exemplary architectural embodiment of the present invention. The example position-determining system 200 can be a PDE, as shown in FIG. 1, or it can take some other form. As illustrated, the example position-determining system includes processor 201, data storage 202, position-determining logic 203, and communication interface 204, which are coupled together by system bus, network, or other mechanism 205.

Processor 201 is one or more general purpose processors and/or one or more dedicated processors (e.g., digital signal processors). Data storage 202 is one or more volatile and/or nonvolatile memory modules or other storage components, which may be integrated in whole or in part with the processor (e.g., as cache memory or in some other form).

The position-determining system externally communicates, through communication interface 204, with MPC or other location requesting entity 220 via link 210. The MPC or other location requesting entity could send location requests, such as GPOSREQs, over link 210 to the position-determining system. Also through the communication interface, the position-determining system communicates with RAN or other mobile network component 221 through link 211. The position-determining system could request satellite information for a particular mobile station, perhaps with the request in the form of an SMDPP, over link 211 to the RAN or other mobile network component. Links 210 and 211 could correspond to an air interface or other medium and could encompass intervening media such as the signaling network 34 of FIG. 1.

Data storage 202 contains position-determining logic 203, which is executable by processor 201. Upon receipt of a request to determine the position of a mobile station, the processor could execute the position-determining logic to apply a primary mechanism to determine the position and, if the primary mechanism fails to determine the position, to then apply a secondary, or fallback, mechanism. The location requesting entity could set a time limit for the location request, and the processor could be given or could otherwise determine—perhaps using the position-determining logic— the time necessary to apply a secondary mechanism. The processor could then dynamically apply the position-determining logic to determine how much time to spend on a primary mechanism before transitioning to the secondary mechanism by subtracting the time necessary to apply the fallback mechanism from the time limit. If at any time the position is determined, that fix would be relayed to MPC or other requesting entity 220, which could in turn relay that information to another entity, such as a location server or an LBS application.

Exemplary Operation

The tasks or steps represented by the different blocks in FIGS. 3, 4, and 5 are separated for ease of understanding, and it should be understood that tasks or steps could be added, deleted, combined, or otherwise changed without departing from the true scope and spirit of the invention. Additionally, the description of these figures refers to PDEs for convenience; the methods described could just as easily be performed by another entity or system. In a preferred embodiment, the methods described are practiced by the exemplary architecture of FIG. 2.

FIG. 3 depicts how a PDE might implement a time limit on a location request. In step 300, the PDE receives a GPOSREQ or other location request from a requesting entity (an LBS application, for example) and a maximum allowed processing time, $T_{total}$. It should be noted that if the PDE is not given any time limit information, it would likely use a PDE internal timer—where the internal timer is fixed and insensitive to the specific request—to dictate $T_{total}$. In step 302, the PDE starts a timer, denoted here as $T_{sys}$, that will track how long the PDE has been processing the current request. In step 304, the PDE employs a location-determination process. In step 306, if the location-determination process determines a position, the PDE returns that position to the requesting entity in step 307. When the timer $T_{sys}$ reaches $T_{total}$, however, and the location-determination process has so far failed to determine a position, the PDE instead returns a default or error message in step 308.

FIGS. 4 and 5 depict an exemplary embodiment of the present invention, as the embodiment could be practiced by a PDE. These figures are an elaboration on FIG. 3, and $T_{sys}$ and $T_{total}$ have the same meanings as in FIG. 3. Conceptually, the steps in the methods of FIGS. 4 and 5 can be separated into two tiers: the first tier encompasses applying the primary location-determination process or processes and determining whether to return a position or to continue with the location determination, and the second tier encompasses applying the secondary location-determination process or processes and determining whether to return a position or a default message (possibly an error message).

Steps 400 and 402 are the same as steps 300 and 302: the PDE receives a position request and a time limit, and the PDE starts the timer. In step 404, given $T_{fallback}$, an expected duration needed to execute a secondary location-determination process, the PDE computes $T_{primary}$, an allowed duration for the primary location-determination process, as the difference between $T_{total}$ and $T_{fallback}$. This embodiment essentially divides the overall time limit into two separate time limits, one for a first tier of location determination ($T_{primary}$), and another for a second tier of location determination ($T_{fallback}$).

In step 406, the PDE employs a primary location-determination process within the limit of $T_{primary}$. In step 408, if the primary location-determination process determined a position, that position is returned in step 409. Upon $T_{sys}$ reaching the limit of $T_{primary}$—a condition met only if the primary location-determination process failed to determine a position before the time limit on the first tier of location determination expired—the PDE transitions to the second tier of location determination in step 410.

FIG. 5 shows the second tier of location determination, entailing steps that may be practiced when the first tier of location determination shown in FIG. 4 fails to determine a position. In step 512, the PDE employs a secondary location-determination process. In step 514, if the secondary location-determination process determined a position, that position is returned in step 515. Upon $T_{sys}$ reaching the limit of $T_{total}$—at which point both the primary and secondary location-determination processes have failed to determine a position—the PDE returns a default or error message in step 516. Note that if no time is allocated to any fallback mechanisms, FIGS. 4 and 5 functionally collapse into FIG. 3.

Without departing from the scope and spirit of the present invention, the tiers of location determination could each encompass more than one particular process or more than one iteration of a particular process. For example, in step 406 of FIG. 4, if the primary location-determination process failed to determine a position, yet the timer had not reached $T_{primary}$, the PDE could run another iteration of that location-determination process or execute another location-determination process in the time remaining. The same variation could be encompassed by step 512 of FIG. 5.

The hierarchy of location-determination processing can be expanded to include more than two levels, or tiers, as well. By way of example, consider three location-determination processes X, Y, and Z with X being the most accurate process, Z being the least accurate, and Y falling somewhere between X and Z with regard to accuracy. As is typical of a high accuracy location-determination process, X has the longest average execution time and still carries the possibility of failure to determine location at the end of that execution time. Z, on the other hand, is the least accurate but most reliable, and it has the shortest average execution time. Again, Y falls between X and Z with regard to reliability and execution time. A location requesting entity might want to balance the probability of determining any location at all against the probability of failure if demanding an exact location. With that goal, a position-determining system having access to processes X, Y, and Z could prioritize those processes such that Y and Z are fallback mechanisms that will be assured a chance to execute before the system returns an error message to the requesting entity.

Given a total time limit of 45 seconds and average execution times 10 seconds and 5 seconds for Y and Z respectively, a position-determining system could subdivide the total time limit into time limits for each of the three processes. Y and Z need a total of 15 seconds to execute, thus the position-determining system could apply primary process X for 45−15=30 seconds total before moving to the fallback mechanisms. If X failed to determine a location within 30 seconds, the system would apply first fallback process Y for the next 10 seconds. If Y also failed to determine a position within its allotted 10 seconds, the system would move to the final fallback mechanism Z. In the remaining 5 seconds, the system would apply Z, and if Z failed, only then would the system return a default or error message to the requesting entity.

Additionally, in an alternate embodiment, the method could transition to the second tier of location determination without terminating the first tier of location determination. In this embodiment, the primary location-determination process or processes would run in parallel with the secondary location-determination process or processes after the transition. This embodiment allows the primary location-determination process to return a position if it determines that position at any time before the total allowed time limit has elapsed. However, this embodiment also allows the secondary location-determination process to return a position (if determined) after the system has transitioned. This embodiment might be used when a position-determining system, or like entity, has parallel processing capacity held in reserve—the capacity being accessible to the system but left free for other applications as a default. The system would employ the parallel processing capacity only while applying the fallback mechanism at the end of the location-determination processing.

Finally, an exemplary embodiment of the invention may take the form of a method of adjusting processing duration in a position-determining system, where the position-determining system applies a primary mechanism (e.g., AGPS) to determine a position (e.g., the geographical position of a cellular mobile station) and, if the primary mechanism fails to determine the position, then applies a secondary mechanism (e.g., one or a combination of satellite-network hybrid, AFLT, and cell/sector location) to determine the position. In this embodiment, the secondary mechanism would be employed only after the timer on the primary mechanism (total allowed processing time minus the expected processing time of the secondary mechanism) had expired.

CONCLUSION

An exemplary embodiment of the present invention allows a position-determining entity or other like entity to determine the location of a mobile station within time constraints set by the entity requesting that position and minimizes the situations in which an error or default message, rather than a position, is returned. It accomplishes this by utilizing both a total allowed processing time and an estimation of the time necessary for a fallback mechanism to compute position. However, it should be understood that the present invention is not limited to the particular embodiments described herein. Steps or components could be added, or the context could be changed, without departing from the true scope and spirit of the invention.

What is claimed is:

1. A method of adjusting processing duration in a position-determining system, wherein the position-determining system applies a primary mechanism to determine a position and, if the primary mechanism fails to determine the position, then applies a secondary mechanism to determine the position, the method comprising:
    receiving into the position-determining system a request to determine the position, the request including a designation of total allowed processing duration for determining the position, wherein the request comprises a Geo Position Request (GPOSREQ) from a mobile positioning center (MPC);
    responsively computing a primary allowed processing duration as a difference between (i) the designated total allowed processing duration and (ii) a predefined value representing an expected duration for successfully applying the secondary mechanism to determine the position;
    detecting that the computed primary allowed processing duration has passed while applying the primary mechanism without yet successfully determining the position, and responsively transitioning to apply the secondary mechanism in an effort to determine the position; and
    outputting to the MPC a GPOSREQ return result (gposreq_rr) that designates the position determined by the secondary mechanism.

2. The method of claim 1, wherein the designated total allowed processing duration is included in a field of the GPOSREQ that carries delay guidance information.

3. The method of claim 1, wherein the designated total allowed processing duration is included in a PositionQualityofService (PQOS) field of the GPOSREQ.

4. The method of claim 3, wherein the designated total allowed processing duration is included in a PQOS Response time portion of the PositionQualityofService field of the GPOSREQ.

5. The method of claim 1, wherein the MPC receives the request from a location-based service (LBS) application, and wherein the MPC transmits an indication of the designated position to the location-based service application.

6. The method of claim 1, wherein the primary mechanism comprises Assisted Global Positioning System (AGPS), and the secondary mechanism comprises a mechanism selected from the group consisting of (i) satellite-network hybrid, (ii) Advanced Forward Link Trilateration (AFLT), and (iii) cell/sector location.

7. The method of claim 1, wherein the position is a position of a cellular mobile station.

8. A position-determining system comprising:
    a communication-interface;
    a processor;
    data storage; and
    position-determining logic stored in the data storage and executable by the processor, upon receipt of a request to determine a position of a mobile station, to apply a primary mechanism to determine the position and, if the primary mechanism fails to determine the position, to then apply a secondary mechanism to determine the position,
    wherein, the request includes a designation of total allowed processing duration for determining the position,
    wherein the request comprises a Geo Position Request (GPOSREQ) from a mobile positioning center (MPC),
    wherein the position-determining logic is executable, upon receipt of the request, to compute a primary allowed processing duration as a difference between (i) the designated total allowed processing duration and (ii) a predefined value representing an expected duration for successfully applying the secondary mechanism to determine the position,
    wherein the position-determining logic is executable to detect that the computed primary allowed processing duration has passed while applying the primary mechanism without yet successfully determining the position, and to responsively transition to apply the secondary mechanism in an effort to determine the position,
    wherein the position-determining logic is further executable to output for transmission to the MPC a GPOSREQ return result (gposreq_rr) that designates the position determined by the secondary mechanism.

9. The position-determining system of claim 8, wherein the designated total allowed processing duration is included in a field of the GPOSREQ that carries delay guidance information.

10. The position-determining system of claim 8, wherein the designated total allowed processing duration is included in a PositionQualityofService (PQOS) field of the GPOSREQ.

11. The position-determining system of claim 10, wherein the designated total allowed processing duration is included in a PQOS Response time portion of the PositionQualityofService field of the GPOSREQ.

12. The position-determining system of claim 8, wherein the primary mechanism comprises Assisted Global Positioning System (AGPS), and the secondary mechanism comprises a mechanism selected from the group consisting of (i) satellite-network hybrid, (ii) Advanced Forward Link Trilateration (AFLT), and (iii) cell/sector location.

13. The position-determining system of claim 8, wherein the position is a position of a cellular mobile station.

14. A position-determining system comprising:
    a communication-interface;
    a processor;
    data storage; and
    position-determining logic stored in the data storage and executable by the processor, upon receipt of a request to determine a position of a mobile station, to apply a primary mechanism to determine the position and, if the primary mechanism fails to determine the position, to then apply a secondary mechanism to determine the position, wherein, the request includes a designation of total allowed processing duration for determining the position, wherein the request comprises a Geo Position Request (GPOSREQ) from a mobile positioning center (MPC), wherein the MPC receives the request from a location-based service (LBS) application, wherein the position-determining logic is executable, upon receipt of the request, to compute a primary allowed processing duration as a difference between (i) the designated total allowed processing duration and (ii) a predefined value representing an expected duration for successfully applying the secondary mechanism to determine the position, wherein the position-determining logic is executable to detect that the computed primary allowed processing duration has passed while applying the primary mechanism without yet successfully determining the position, and to responsively transition to apply the secondary mechanism in an effort to determine the position, and wherein the position-determining logic is further executable to output for transmission to the MPC a GPOSREQ return result (gposreq_rr) that designates the position determined by the secondary mechanism, and wherein the MPC transmits an indication of the designated position to the location-based service application.

* * * * *